April 21, 1964  K. WATSON  3,129,608
MECHANICAL GEARING

Filed Nov. 25, 1960  2 Sheets-Sheet 1

INVENTOR
Kenneth Watson

BY Larson and Taylor
ATTORNEY

April 21, 1964  K. WATSON  3,129,608
MECHANICAL GEARING

Filed Nov. 25, 1960  2 Sheets-Sheet 2

INVENTOR
Kenneth Watson

BY *Larson and Taylor*

ATTORNEY

_3,129,608_
MECHANICAL GEARING
Kenneth Watson, Woolston, Southampton, England, assignor to Westland Aircraft Limited, Yeovil, England
Filed Nov. 25, 1960, Ser. No. 71,502
Claims priority, application Great Britain Dec. 4, 1959
9 Claims. (Cl. 74—665)

This invention relates to mechanical gear drives particularly, although not exclusively, for use in helicopter transmission gearing.

On helicopter transmissions it is a common practice to drive the main bevel wheel by means of a single bevel pinion and this determines, due to the high loading upon a single tooth, the relatively large size of the installation.

It is an object of the invention to provide a mechanical gear drive having means whereby the distribution of load upon the teeth of a bevel can be improved so that a reduction in the weight and size of the installation can be effected.

It is a further object of the invention to ease manufacturing tolerances upon bevel wheels carrying substantially equal loads from a common input drive and driving a common bevel wheel.

The invention consists in a mechanical power transmission including an output bevel wheel driven by two bevel pinions rotating upon axes converging towards the centre of said bevel wheel, each of the bevel pinions receiving driving power by means of resilient quill shaft means from an adjacent outer bevel wheel means, each of the outer bevel wheel means meshing with a central pinion means the central pinion receiving the power input.

The invention also consists in a mechanical power transmission including an output spiral bevel wheel driven by two spiral bevel pinions rotating upon axes converging towards the centre of the bevel wheel, each of the pinions receiving driving power by means of resilient quill shaft means from an adjacent spiral outer bevel wheel means, each of the outer bevel wheel means meshing with a power input receiving central pinion, the spiral hands of the spiral bevel pinion and the spiral outer bevel wheel being the same so that the axial thrust from each counteracts the one upon the other so that the resultant axial thrust upon their bearing means is reduced.

The invention also consists in a mechanical power transmission as in the preceding paragraph in conjunction with a helicopter wherein a hollow rotor shaft is driven by the bevel wheel, the bevel wheel being hollow to accommodate a control member for collective and cyclic pitch control.

Referring to the drawings FIGURE 1 shows a diagrammatic side elevation of a helicopter transmission.

Figure 1:
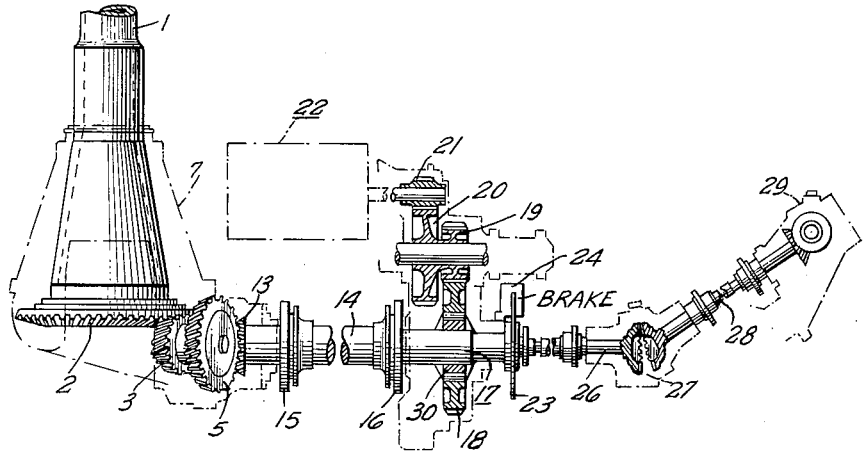
Figure 2:
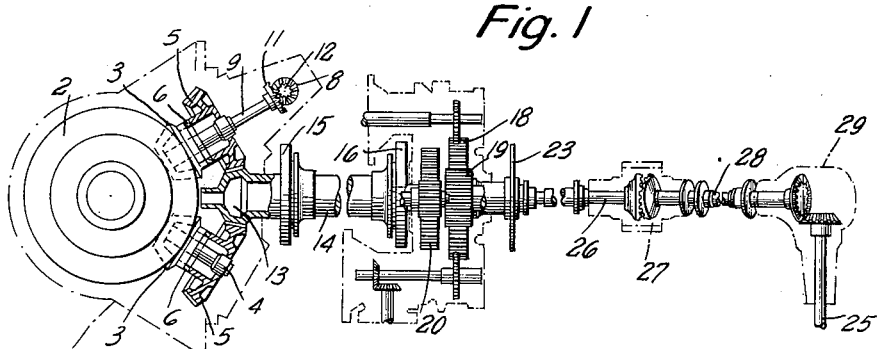
FIGURE 2 is a diagrammatic plan view of FIGURE 1.
Figure 5:
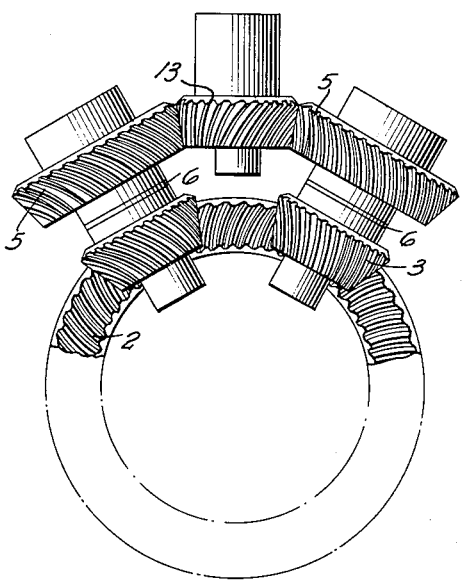
FIGURE 5 is a bottom plan view of the spiral bevel gears.

The preferred embodiment of the invention will now be described with reference to FIGURES 1 and 2, wherein we provide a main rotor shaft 1 having rigidly attached to its lower hollow conical end a main bevel wheel 2. Bevel wheel 2 meshes with a pair of bevel pinions 3 which are driven by quill shafts 4 situated between bevel pinions 3 and outer bevel wheels 5. Between 3 and 5 a distance bush 6 is fitted to take end loads between the two. The bevels 2, 3, 5 and 13 have spiral teeth, but the hands of the spirals of 3 and 5 are arranged to be the same to assist in balancing end loads. The quill shaft 4 is secured at its ends by splines (not shown) to bevels 3 and 5. Gear casing 7 is provided with bearings (not shown) for the gearing and rotating shafts. An oil pump means 8 is driven by quill shaft extension 9 and bevel gears 11 and 12. Central pinion 13 drives simultaneously the two outer bevel wheels 5. Main torque shaft 14, with its flexible end couplings 15 and 16, is driven by means of torque shaft continuation 17 and a double speed reducing gearing 18, 19, 20 and 21 from the engine 22. Torque shaft extension 17 carries a disc brake 23 which may be acted upon by hydraulic means 24. Tail rotor spindle 25 is driven from torque shaft continuation 17, by torque shaft extension 26, bevel gear installation 27, inclined torque shaft 28 and tail rotor gearbox 29, there being no appreciable change in speed of the tail rotor spindle 25 compared with the speed of 17. Between torque shaft continuation 17 and gear wheel 18 is provided a free wheel means 30. The gear casing 7 and the main rotor shaft 1 are hollow to accommodate a spider control member for collective and cyclic pitch control, four arms of the control member pass through slots in the rotor shaft 1 and communicate by rod means with the rotor blades. The pitch control members are not shown in the drawings.

In operation, power from the engine 22 is transmitted via the double speed reduction gearing 21, 20, 19 and 18 through the free wheel 30 to the torque shaft continuation 17, some power being transmitted to the tail rotor but the major portion passes through the main torque shaft 14 with its end couplings 15 and 16 to the central pinion 13. The central pinion 13 meshes with the two outer bevel wheels 5 and the forces acting upon the teeth are substantially equal, thus there is substantially no radial loading upon the bearings carrying the central pinion 13. The power passing to each of the outer bevel wheels 5 is substantially half of the power transmitted by the central pinion 13. Each of the outer bevel wheels transmit power by means of the quill shaft 14 to one of the pair of bevel pinions 3 which mesh with the bevel wheel 2. The quill shafts 14 serve to divide the power input into two substantially equal parts. This would not be the case if the bevel pinion 3 and the outer bevel wheel 5 were rigidly attached as the tolerances required would be too high to be a practicable proposition. It will thus been seen that the present invention reduces the tooth loading of the bevel wheel 2 and also reduces the tolerances required in the manufacture of the gears.

Between the bevel pinion 3 and its associated outer bevel wheel 5 is provided a distance bush 6. This bush 6 is used to transmit end loading between the bevels 3 and 5 and the hand of the spiral of each is arranged to be the same so that the end loads substantially counteract each other so that the resulting thrust upon the bearings is minimised.

If the engine were to fail and it was required to autorotate, power would be taken from the rotor shaft 1 and transmitted to the essential power user i.e. the tail rotor and the oil pump means. The free wheel means 30 would prevent power being used by the double speed reduction gearing 18, 19, 20 and 21 or the engine 22.

The rotor may be braked by hydraulic means 24 acting upon disc brake 23 which is mounted upon the torque shaft continuation 17.

It will be seen that the arrangement of the gearing and quill shafts provide a convenient compact installation and also provides auxiliary power take off points at the outer bevel wheels 5 which could be used for example for a hydraulic pump or a crop spraying pump.

While this embodiment has described one engine 22 driving the double speed reduction gearing it is also possible to have two engines in tandem having suitable free wheel arrangements driving the double speed reduction gearing.

Figure 3:
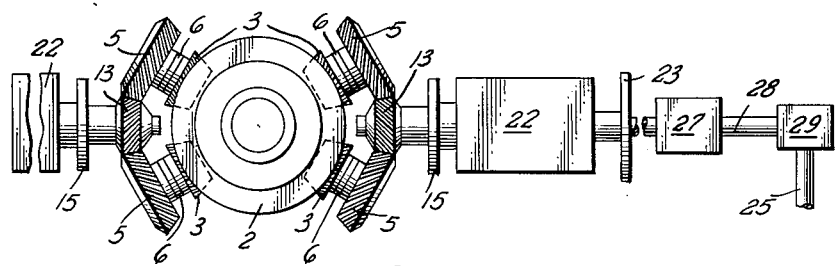
FIGURE 3 is a diagrammatic plan view of another embodiment of the invention having two engines and four bevel pinions driving the main bevel wheel.

In another embodiment as shown schematically in FIGURE 3 two engines are used. The engines are in line and face each other across the bevel wheel 2. The gearing arrangement is substantially the same as in FIGURES 1 and 2 except that it is duplicated and there is no drive taken from the forward engine for the tail rotor. Besides the advantages already enumerated for the previous embodiment this embodiment has the advantage of better weight distribution about the rotor shaft.

Figure 4:
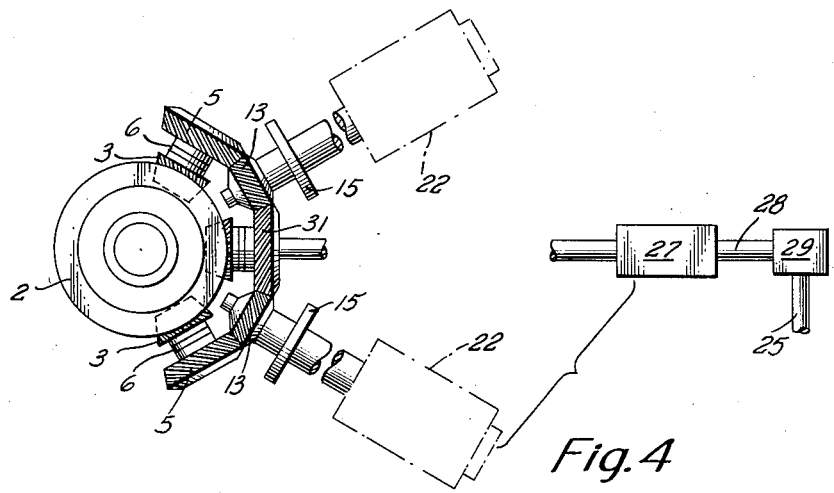
FIGURE 4 is a diagrammatic plan view of a further embodiment having two engines and three bevel pinions driving the main bevel wheel, a drive for a tail rotor being taken from the middle bevel pinion.

In a further embodiment, as shown schematically in FIGURE 4, two engines are used to drive the rotor shaft by means of three bevel pinions meshing with the bevel wheel 2. The general principles of the gearing are the same as those described in the preferred embodiment but in this particular arrangement the central outer bevel wheel 31 is used to transmit power to the tail rotor.

I claim as my invention:

1. A mechanical power transmission having a power input and a power output, comprising a power output bevel wheel, a pair of resilient quill shafts, two bevel pinions, a single bevel pinion being mounted on each of said quill shafts, said bevel pinions meshing with said bevel wheel and rotating upon axes converging towards the center of said bevel wheel, an outer bevel wheel mounted on each of said quill shafts and a central pinion receiving said power input meshing with said outer bevel wheels.

2. A mechanical power transmission according to claim 1 and further including drive means from at least one of said outer bevel wheels for providing power for driving auxiliary equipment.

3. A mechanical power transmission according to claim 1 wherein the bevel wheels, bevel pinions, outer bevel wheels and central pinion have spiral teeth, said spiral bevel pinions and said outer spiral bevel wheels having the same spiral hand, such that axial thrust on one of said spiral bevel pinions is substantially counteracted by axial thrust from its adjacent outer spiral bevel wheel.

4. A mechanical power transmission having a power input and a power output, comprising an output spiral bevel wheel, a pair of resilient quill shafts, two spiral bevel pinions, a single one of said bevel pinions being mounted on each of said quill shafts, said bevel pinions meshing with said spiral bevel wheel and rotating upon axes convering towards the center of said spiral bevel wheel, an outer spiral bevel pinion mounted on each of said shafts and a central pinion receiving said power input meshing with said outer bevel wheels, said spiral bevel pinion and said spiral outer bevel wheel having the same spiral hand such that axial thrust on said spiral bevel pinion is substantially counteracted by axial thrust from its adjacent outer spiral bevel wheel.

5. A mechanical power transmission having a power input and a power output, comprising an output spiral bevel wheel, a pair of resilient quill shafts, two spiral bevel pinions, a single one of said bevel pinions being mounted on each of said quill shafts, said bevel pinions meshing with said spiral bevel wheel and rotating upon axes converging towards the center of said spiral bevel wheel, an outer spiral bevel pinion mounted on each of said quill shafts, and a central pinion receiving said power input meshing with said outer bevel wheels, said spiral bevel pinion and said spiral outer bevel wheel having the same spiral hand such that axial thrust on said spiral bevel pinion is substantially counteracted by axial thrust from its adjacent outer spiral bevel wheel, a power plant having a power output, means comprising a speed reduction gearing driven from said power output, a free wheel means in the output of said speed reduction gearing means, a main torque shaft means receiving power from said speed reduction gearing means, first and second flexible couplings on said torque shaft, said power plant transmitting power to said central pinion of said mechanical power transmission.

6. A mechanical power transmission as claimed in claim 5 wherein said main torque shaft is disposed horizontally and mounted below said power plant.

7. A mechanical power transmission as claimed in claim 5 wherein braking means are provided, said braking means comprising a rotating element and a stationary element, said rotating element being arranged to rotate on an axis coinciding with the axis of said main torque shaft.

8. A mechanical power transmission having two power inputs and a power output, comprising a spiral bevel wheel, four spiral bevel pinions meshing with said spiral bevel wheel, and arranged in pairs to form a first set of two pinions and a second set of two pinions, the axes of the pinions in each set converging toward the center of said spiral bevel wheel, four outer spiral bevel wheels each of which is positioned adjacent to a spiral bevel pinion, four resilient quill shaft means each of which connects a spiral bevel pinion and its adjacent outer spiral bevel wheel, two central pinion means, one of which meshes with the two outer spiral bevel wheels associated with first said set of pinions, the other of said central pinions meshing with the two outer spiral bevel wheels associated with said second set of pinions, the two central pinions forming said two power inputs of said power transmission, said spiral bevel pinions and their adjacent outer spiral bevel wheels having the same spiral hand such that axial thrust on said spiral bevel pinion is substantially counteracted by axial thrust from its adjacent outer spiral bevel wheel.

9. A mechanical power transmission having two power inputs and a power output, comprising a spiral bevel wheel, three spiral bevel pinions meshing with said spiral bevel wheel, three outer spiral bevel wheels situated one adjacent to each of said spiral bevel pinions, three resilient quill shaft means, one of said quill shaft means connecting each spiral bevel pinion to its adjacent outer spiral bevel wheel, two central pinion means, each of said central pinions being arranged to mesh with two spiral outer bevel wheels such that axial thrust on said spiral bevel pinion is substantially counteracted by axial thrust from its adjacent outer spiral bevel wheel.

References Cited in the file of this patent

UNITED STATES PATENTS

| | | |
|---|---|---|
| 1,040,443 | Signor | Oct. 8, 1912 |
| 2,025,561 | Wilford | Dec. 24, 1935 |
| 2,187,614 | Ormsby | Jan. 16, 1940 |
| 2,366,272 | LeTourneau | Jan. 2, 1945 |
| 2,399,076 | Trice | Apr. 23, 1946 |
| 2,479,406 | Rapuano | Aug. 16, 1949 |
| 2,552,864 | Piasecki | May 15, 1951 |
| 2,600,930 | Sikorsky | June 17, 1952 |
| 2,705,538 | Russo | Apr. 5, 1955 |
| 2,741,351 | Fletcher et al. | Apr. 10, 1956 |
| 2,815,709 | Puhlmann | Dec. 10, 1957 |

FOREIGN PATENTS

| | | |
|---|---|---|
| 919,659 | France | Mar. 14, 1947 |
| 697,391 | Great Britain | Sept. 23, 1953 |